Patented Jan. 3, 1939

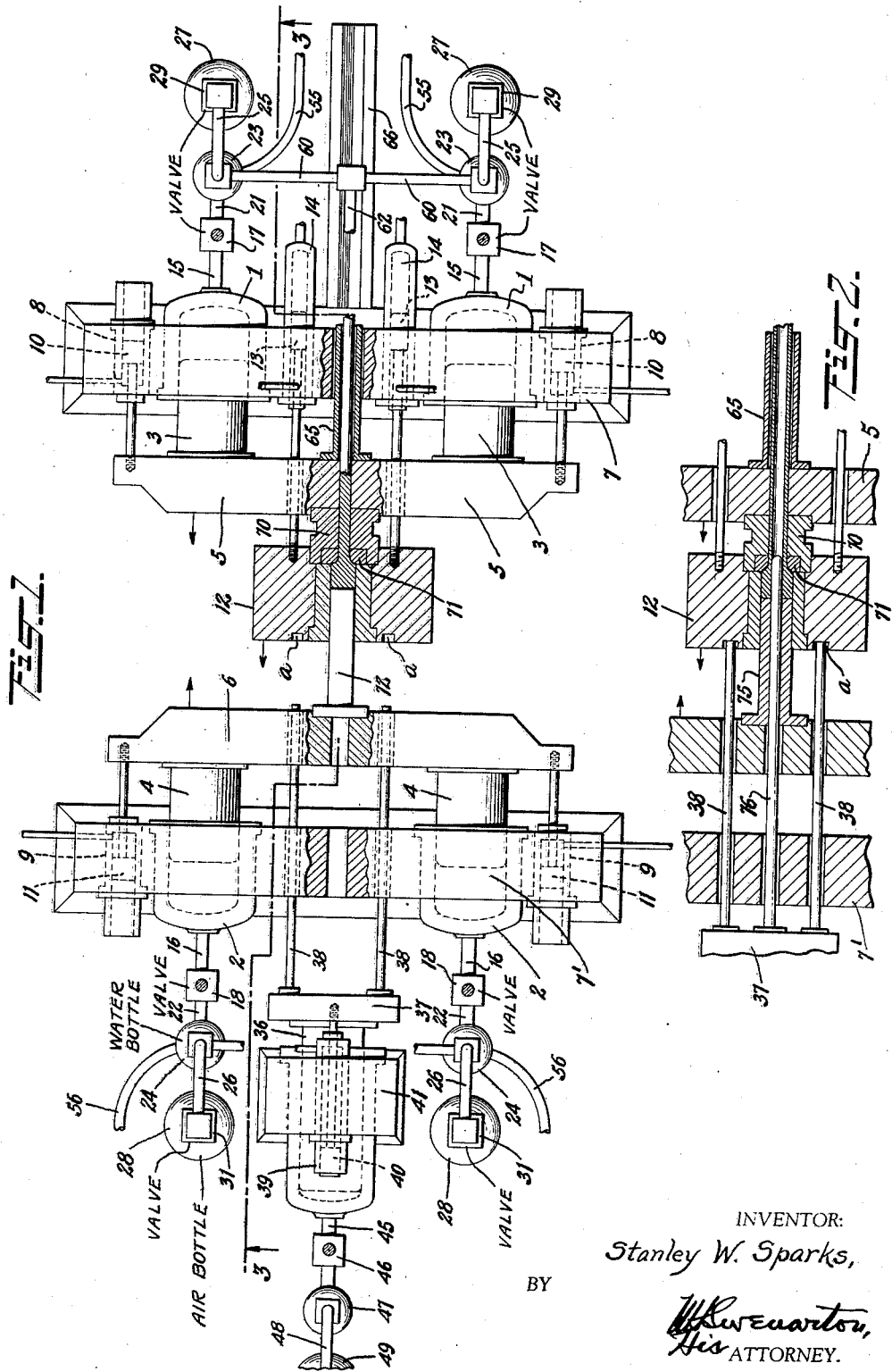

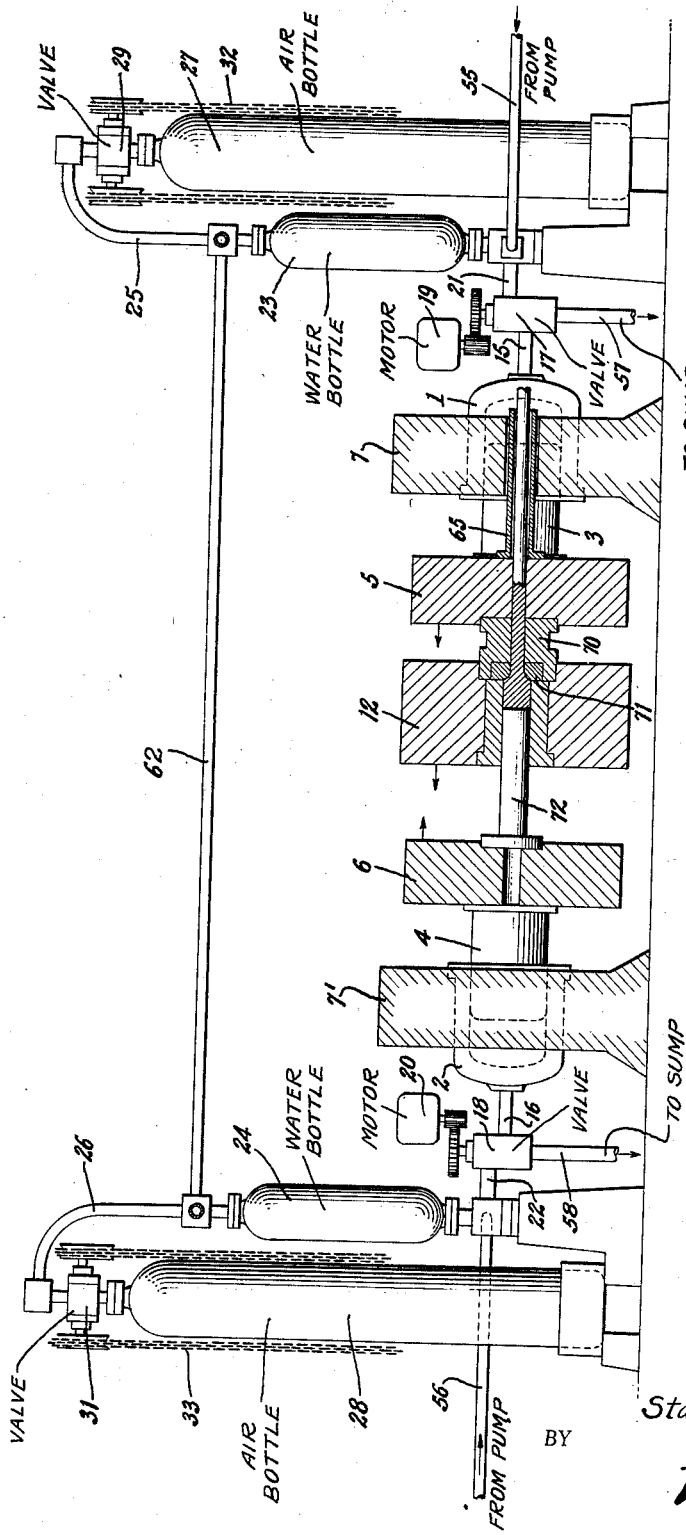

2,142,703

UNITED STATES PATENT OFFICE 2,142,703

METHOD OF AND APPARATUS FOR EXTRUDING ELONGATED SOLID AND HOLLOW METAL SHAPES

Stanley W. Sparks, Norwalk, Conn., assignor to Sparks Processes, Incorporated, New York, N. Y., a corporation of Connecticut Application August 31, 1935, Serial No. 38,845

1 Claim. (Cl. 207—10)

This invention relates to the production of elongated solid and hollow shapes of ferrous metal or refractory bronzes and has for its principal objects the economical production by high-velocity extrusion of such elongated shapes from hot plastic metal blanks, more especially from ingots or partially worked blanks, with the consequent elimination of sundry intermediate operations now necessarily employed in the steel industry in the production of finished solid shapes and tubes by methods involving tolling operations.

Further objects of the invention are the production of elongated shapes of the aforesaid metals, which are of superior finish, homogeneous wall texture and free from the inherent defects of the original blank, in a compact, sturdy and smooth functioning hydro-pneumatic press equipment in which the tool and die cost is extremely low. Moreover such method of extrusion admits of the employment, as the blanks to be extruded, of ingots of from 3 to 7 tons in weight, which large ingots heretofore it has been impossible to successfully extrude.

It has long been recognized in the extrusion art that rapidity of flow of metal is a prime factor in the successful extrusion of metals and particularly of ferrous metals, since unless a high degree of plasticity of the metal can be maintained in the blank being extruded and the rapid flow of the metal through the container and die is effected, enormous pressures on the metal are required to complete the extrusion, and consequently the wear on the dies and tools, due to friction thereon and the deleterious effects resulting from prolonged surface heating thereof, is so great as to be virtually prohibitive in cost, especially if a shape of smooth finish and considerably reduced section, as compared with the blank from which it is extruded, is to be obtained.

In an attempt to accomplish such high speed extrusion, resort has been had, as set forth in Patent No. 1,892,789, to high speed mechanical presses in which the extrusion tool was caused to move at an average speed of over 5″ per second, a speed which while considerably in excess of the maximum speed of extrusion tool movement in any known hydraulic extrusion press is but a small fraction of the high speed, for example 12″ to 36″ of blank length per second, which can be obtained by my improved hydro-pneumatic method of extrusion. Owing to the inherent limitations of such mechanical extrusion methods, the size of blank which can be operated upon is restricted to a length-diameter ratio of not less than 2 to 1 and not over 2½ to 1, whereas in my improved high speed extrusion, ingots or blanks of a length of even three or more times their diameter can be successfully employed, and as a direct consequence, due to the lesser proportionate reductions in cross-section that it is necessary to effect when extruding such large ingots or blanks into the elongated shapes desired, considerably lower pressures may be employed to effect the flow of the metal of the ingot or blank through the die. Furthermore, with the employment of these higher extrusion speeds such as above specified are preferably employed, the time of hot metal pressure-contact with the tools or die elements and consequently for the transfer of heat to the forming surface thereof, as well as for the cooling off of the ingot or blank, is very much less than when the extrusion is effected at speeds of 5″ or 6″ of billet length per second or thereabouts, as specified in such patent. Such faster extrusion speeds as employed by me, combined with the aforesaid lower extrusion pressures that are required to effect the extrusion, produce considerably less frictional wear on the forming surfaces of the tools or die elements than results where blanks within the range of 2 to 2½ times the length to diameter are employed and the same are extruded at the slower speeds specified in said patent, even though the cross-sectional area and length of the extruded shapes may be the same in both cases. Likewise, as must be apparent, I am enabled to produce much longer lengths of extruded shapes, and consequently a substantially greater tonnage in the same length of time with much less tool wear, than has heretofore been possible when employing any other known method of extrusion.

In the accompanying drawings, forming a part of this specification, in which is illustrated, principally diagrammatically, a form of compound hydro-pneumatic press equipment in which my improved method of extrusion can be successfully performed, Figure 1 is a diagrammatic plan view, partly in section, of such apparatus;

Fig. 2 is a fragmentary detail, central horizonal section showing the press illustrated in Fig. 1 equipped with a piercing mandrel; and Fig. 3 is a central diagrammatic, longitudinal vertical section, partly in elevation, taken on the line 3—3 of Fig. 1.

Referring to the drawings and the construction shown therein, the reference numeral 1 designates the main cylinders at one end of said compound or duplex, hydro-pneumatic press, 2 the opposing main cylinders at the opposite ends of said press and 3 and 4 snug-fitting main pistons or rams which are adapted to reciprocate in said cylinders. Crossheads 5 and 6, which are rigidly mounted on the end of said plungers in the well known manner, are adapted to move in synchronism with each other during the pressure stroke of the press. The main cylinder housings 7, 7 are also equipped with draw-back cylinders 8 and 9, in which pistons 10 and 11 respectively reciprocate, and which serve to retract the respective crossheads 5 and 6 to which said rams are rigidly secured. A slidable or so-called floating container 12 is interposed between the crossheads 5 and 6, the same being secured to pistons 13 of a pair of traverse cylinders 14, which latter are also mounted in the main cylinder housings. Extremely short intake pipes or conduits 15 and 16 serve to admit water to the main cylinders 1 and 2 and three-way valves 17 and 18, which are respectively operated by electric motors, motors 19 and 20, are interposed between said intake pipes and short outlet conduits 21 and 22 that are in permanent communication with the lower ends of two pairs of water bottles 23 and 24 respectively. Pipes 25 and 26 afford communication between the top of such water bottles and air bottles 27 and 28. Valves 29 and 31, that are interposed in the said respective conduits 25 and 26, serve to control the passage of air from the air bottles into the upper ends of the said water bottles and chains 32 and 33 admit of the convenient manipulation of these valves 29 and 31 by an operator stationed at the floor level.

In order that elongated hollow shapes, such as pipes or tubes, as well as solid shapes, may be extruded in the press, a supplemental pressure cylinder 35 is provided, the same having a ram 36 which is adapted to reciprocate therein, and which carries a mandrel-carrying crosshead 37. Guide rods 38, which are rigidly mounted on the crosshead, are slidably mounted in the housing 7' and crosshead 6 and at the limit of the piercing stroke (see Fig. 2), the ends of the rods 38 are adapted to engage the bottom of recesses a formed in the end face of said container 12 and thereby further forward movement of the mandrel or piercer, hereinafter described, with respect to the container 12 will be prevented and the end of the mandrel will be maintained stationary in the mouth of the die, all as hereinafter described, during the piercing operation. Drawback cylinders 39, in which pistons 40 reciprocate, are mounted in housing 41 at opposite sides of the said hydraulic pressure cylinder 35 that is also mounted in said housing, and these pistons 40 are connected directly to said crosshead 37.

An extremely short intake pipe 45, controlled by a three-way valve 46, similar to the valves 17 and 18, serves to admit either of the introduction of water into the cylinder 35 from a water bottle 47, that is generally similar to water bottles 23 and 24, or else of the discharge of water from cylinder 35 to the sump (not shown), all in the same manner as that by which water is charged into, or discharged to the sump from, the cylinders 3 and 4. The top of the said water bottle 47 is connected by a valve-controlled conduit 48 with an air bottle 49 in the same manner that the water bottles 23 and 24 are connected with their respective air bottles 27 and 28.

Conduits 55 and 56 afford permanent communication between high pressure hydraulic pumps (not shown) and the lower ends of the respective water bottles 23 and 24 and a similar conduit (not shown) affords permanent communication between the lower end of the water bottle 47 and the supply pump (also not shown). Conduits 57 and 58 serve to conduct water discharged from the cylinders 1 and 2 to the sump. A similar discharge pipe serves to conduct water discharged from cylinder 35 and through the control valve thereof to the sump. Preferably the pumps which supply water to the water bottles 23, 24 and 47 are in communication with the aforesaid sump and thereby the water employed in the system is recirculated during the successive cycles of operation of the press. Equalizer pipes 60 and 62 serve to equalize the air pressure on the water bottles 23 and 24 when the valves 29 and 31 are open.

The crosshead 5 is provided with a guide tube 65 which is adapted to deliver the extruded elongated shape on to a recovery trough 66. A pedestal 70, carried by the crosshead 5, serves as a support for a removable hollow die 71 that is mounted in the outer end thereof and the crosshead 6 serves as a support for extrusion tool 72, that is bolted thereto, and is adapted to cooperate with said die and effect the compound extrusion of the metal of the blank through said die upon the synchronous movement of the crossheads 5 and 6 in opposite directions in the manner hereinafter described.

In the construction illustrated in Fig. 2, the tool 72 has been replaced by a hollow toool 75 which is mounted on crosshead 37 and a mandrel 76 is axially mounted on the crosshead 37 which is adapted to function as a piercer element and the nose thereof (the same being preferably replaceable) to function as a male die during the extrusion of elongated hollow shapes, such as a pipe or tube for example.

In carrying out the manufacture of elongated solid shapes in accordance with my improved method of extrusion, the plungers 3 and 4 are retracted into their respective power cylinders 1 and 2, thus effecting the maximum separation of the crossheads 5 and 6. The container 12 is then projected to the left, with respect to its position in Figure 1, by means of the plungers 13 of traverse cylinders 14. A hot plastic metal ingot (preferably one which is either of polygonal or corrugated contour) is then positioned between the die 71 and the ram 72, the valves 17 and 18 are momentarily opened and sufficient water is then admitted into cylinders 1 and 2, from the water bottles 23 and 24, to move the plungers 3 and 4 and cause the tool 72 and die 71 to grip said ingot and support the same axially therebetween. Thereupon the container is traversed, by the pistons 13 secured thereto, to the extreme right-hand position and brought into engagement with die 71. Then valves 17 and 18 are rotated to admit water from the water bottles 23 into the cylinders 1 and 2 positioned at the respective ends of the press and thereby the crossheads 5 and 6 are caused to rapidly move towards each other and thereby the extrusion of the metal of the plastic ingot or blank employed is effected through the die at an extremely high rate of speed.

Upon the completion of the extrusion stroke of the press, the valves 18 are rotated, to open communication between the cylinders 2 and the sump, and the plungers 4 are retracted into their cylinders by the pistons 11 of the drawback cylinders 9, which pistons, as stated, are secured to the crosshead 6 carried by said plungers and simultaneously clamping means are applied to the extruded shape, beyond the guide tube 65, to prevent movement thereof during the movement of the tool 72, which is carried by said crosshead 6, as it is retracted away from the nubbin. Meanwhile the container 12 is traversed to its extreme left-hand position by the traverse cylinders 14 and the pistons 13, which latter are connected to the container. Sufficient additional water is then admitted from water bottles 23 and 24 into the cylinders 1, to forcibly project the die 71, carried by crosshead 5, against the conical base of the nubbin, whereby the nubbin is stripped or severed from the extruded shape. Such extruded shape is then withdrawn from the guide tube and recovered from the delivery trough 66 on to which it will be projected. The parts are then restored to their original position and another cycle of extrusion operations effected on a fresh ingot or blank.

In the extrusion of elongated hollow or tubular shapes, the same general procedure as above described for the extrusion of solid shapes is followed, except that after the plastic metal ingot or blank has been positioned between the die 70 and the hollow tool 75, which latter is employed when so extruding hollow shapes, and also after the container has been moved to envelope the ingot and engage the die, the crosshead 37 is caused to move to the right from its previous position at the left adjacent crosshead 6, by admitting water from the water bottle 47 through valve 46 and intake pipe 45 into the cylinder 35, such forward movement being continued until the container is stopped by the engagement of the ends of the guides 38 with the bottom of the recesses a formed in such container. At that moment, the mandrel 76 will have completely pierced the ingot and the nose of the mandrel will project through the mouth of the die and slightly into the throat or bore thereof and these relative positions will be maintained throughout the subsequent extrusion stroke which is effected in identically the same manner as when extruding solid shapes. Upon the completion of the extrusion stroke, the hollow nubbin is stripped or removed from the extruded tube in the same manner as employed in the above described procedure for making solid shapes. As will be apparent, the movement of the container 12 to its extreme left-hand position, prior to the stripping of the nubbin from the extruded tube by the forcible engagement of the die therewith, will effect the simultaneous movement of crosshead 37 and consequently result in the withdrawal of the nose of the mandrel from the die and thus there will be no tendency for the nose of the mandrel to become scored or marred during the stripping operation.

Due to the extremely short time of actual contact of the hot plastic metal with the tools, especially the die and mandrel elements, combined with the relatively low pressures required to be exerted on said tools during the extrusion operation because of the fact that the ingots or blanks employed may be of a length of from three or more times the diameter or bore of the extrusion chamber of the container and consequently the reduction ratio will not exceed about 15 to 1 even when producing long lengths of shapes of very small cross-sectional area, it is possible to employ ingots or blanks of unusually large cubical content and width, for example ingots of from 24" to 28" in upset diameter and from 74" to 84" in length can be satisfactorily handled and processed when practicing my invention.

The herein described extrusion method entirely eliminates the difficulties heretofore encountered in attempting to effect the hydraulic high speed extrusion of metals, since by virtue of the fact the intake pipes to the hydraulic cylinders employed are extremely short, preferably less than 7 ft. in length and not exceeding about 15 ft. in length, from the outlet of the water bottle to the inlet of the hydraulic power cylinders, the insurmountable difficulty heretofore encountered of bending large, thick-wall pipes in order to admit of the introduction of the requisite amount of water to the main cylinders of a press is avoided and especially is the retardation, due to friction between successive layers of the water and which friction is directly proportional to the velocity of flow, up to a certain critical velocity, substantially entirely eliminated. In the authoritative Physics text book by R. A. Milliken (a Nobel prize winner) entitled "First course in physics" on pages 203 and 204 thereof it is explained that such retardation results from the many eddies that are formed at the critical velocity, all as illustrated in Fig. 166 (2), at which point retardation is greatly augmented and after which point the resistance to flow increases with the square of the velocity of flow. Through the employment of relatively short, large-diameter, valve-controlled intake pipes for connecting the water bottles with the main hydraulic cylinders, it is possible to attain a speed of movement of the hydraulic rams of the hereindescribed compound or duplex that heretofore was believed to be unattainable and, furthermore, through the employment of opposing pressure cylinders whereby such compound extrusion is effected, it is possible to obtain an extrusion speed that is double that attainable when employing a single ended press. Moreover through the employment of pneumatic pressure, rather than liquid head pressure, it is not only possible to dispense with the employment of accumulators of enormous size which it has always been necessary to locate at remote distances from a press, but also applicant is enabled to employ relatively small diameter pipe to conduct the air between the air bottles or reservoirs and the water bottles employed without any deleterious effects resulting from the use of such small pipe insofar as the speed of movement of the main extrusion rams are concerned.

The enormous kinetic energy necessary to perform the high speed extrusion operation on large size ingots, for example, is developed from the energy stored within the various air bottles which communicate with the water bottles and which latter in turn communicate through extremely short, large intake pipes with the main hydraulic cylinders and is rendered instantly available by quick-acting valves, preferably electrically and automatically controlled, and such air pressure as is required is furnished by high pressure pumps also preferably electric and automatically controlled (not shown).

In order to insure of the synchronized movement of the hydraulic plungers the four air bottles which serve to supply air to the water bottles 23 and 24 are interconnected by equalizer pipes aforesaid and thereby a balanced and uniform pressure can be maintained in the four main hydraulic plungers 1 and 2. As is apparent from the foregoing disclosure, the drawback and traversing cylinders of the press may also be hooked up with associated water bottles and air bottles, if desired. The cubical content of the air bottles 27 and 28 should be several times that of the associated water bottles 23 and 24 with which they are connected, being preferably about eight times greater in capacity than the said water bottles, as thereby irrespective of the amount of water discharged from the water bottles, the pressure on the water in such water bottles will not drop more than one-eighth below the maximum pressure and for all practical purposes will thus be maintained generally uniform.

The manner of introduction of the billet or blank into the container and of the positioning of the parts of the apparatus during such introduction, renders it possible to utilize the entire stroke of the plungers of the main cylinder as well as to accomplish the piercing of the billet or blank in those cases where hollow shapes are to be extruded, without appreciable loss of time for putting the tools, the blank and the container in the proper position for extrusion, with the consequence that there is a minimum loss of heat by the plastic metal blank and therefore it is possible to accomplish the extrusion of huge ingots such as aforesaid, for example ingots weighing from 3 to 7 tons. Furthermore, because of the high speed of extrusion and the relatively low pressures on the die elements, as well as the extremely short period of contact of the hot plastic metal therewith, it is possible to employ in the extrusion of steel shapes ordinary chilled cast grey iron, chilled nickel-alloyed cast iron and sundry inexpensive steels and steel alloys for the dies and liners of the press, whereas heretofore in the extrusion of ferrous metals it has been essential to employ expensive alloy steels, for this purpose.

To facilitate the delivery of the extruded shape, the bore of the pedestal 70 and of the guide tube 65 should be of slightly enlarged cross-section, as compared with that of the delivery opening of the die 71, as thereby the free and substantially unrestricted passage of the extruded shape therethrough is permitted.

In operating on large ingots or blanks of say 24 to 28 inches in diameter and 72 to 84 inches long, it is desirable to employ speeds of extrusion substantially in excess of 20 inches of blank length per second and preferably from 24 inches to 36 inches per second and to effect the extrusion of at least 30 feet of elongated shape per second. In no event should ingots or blanks of 24 inches diameter or greater and of a length-to-diameter ratio of more than 2½ to 1 be extruded at a speed that is not in excess of 18 inches of billet length per second. However, small billets or blanks of a length-to-diameter ratio above 2½ to 1 may be extruded even at lower speeds, but in no case below 12 inches of blank length per second.

In the charging of the air bottles, particularly where it is desired to build up the pressure therein in some 6500 lbs., which pressures are especially desirable in the extrusion of large ingots, it is preferable that a large air pump be first employed to introduce compressed air, under the maximum pressure of the particular pump employed, into the water bottles 23 and 24 through the pipes 55 and 56 while the valves 17, 18, 29 and 31 are closed, then the valves 29 and 31 are opened, to afford communication between the water bottles and the air bottles 27 and 28 respectively, and water under high pressure is charged through the pipes 55 and 56 in order to displace all of the air in said water bottles. Thereupon the valves 29 and 31 are again closed, the water bottles again similarly charged with compressed air and the charge of compressed air again hydraulically delivered to the air bottles, as before, and the cycle of operations repeated until the air bottles 27 and 28, as well as any other air bottles that may be employed in the system, are charged with air compressed to the desired extent. Some method of charging the air bottles renders it possible to create pressures therein far in excess of those which are obtainable with any air pumps ordinarily available for industrial use, particularly since the difficulties which would be encountered with the valves employed for sealing high pressure pumps capable of directly creating such high pressures are substantially entirely eliminated, as the water column, which serves to displace the charge of compressed air periodically introduced into the water bottle, acts as a perfect liquid seal and consequently prevents the possibilities of any escape of air from the system during such charging operation.

Through the employment of ingots or blanks of a relatively high length-to-diameter ratio, namely in excess of 2½ to 1 and preferably not less than about 3 to 1, it is possible not only to accomplish a very substantial reduction in the amount of pressure required to effect the extrusion, owing to the lesser reduction, as above explained, which is required to produce the particular shape desired, but also it is possible, as a consequence of such lesser reduction, to produce extremely long lengths of solid shapes or hollow shapes that could not possibly be otherwise extruded owing to the limitation in the cubical content of the blanks that can be successfully extruded by other methods wherein the compound extrusion operation is not employed and much lower speeds are used. Again, owing to the high speed of movement of the parts, as well as the fact as above stated that there is no appreciable lost motion from the moment the extrusion tool or mandrel, when the latter is employed, first commences to move up to and including the completion of the extrusion of the desired shape, there is a minimum of contact between the metal of the tools or die elements. In fact, such time of contact even in the extrusion of extremely large ingots, can be kept within about a total of 5 seconds even when extruding lengths of over 30 feet and the actual time of contact of the tools and dies with the hot metal during the period when the high pressures required for the actual extrusion are applied, does not exceed about one second even when extruding shapes of 60 feet in length.

While in the preferred example of my extrusion method as herein illustrated I have employed what may be appropriately termed "compound direct" extrusion whereby the metal of the blank is propelled through an oppositely moving container which is maintained stationary relative to the die, nevertheless, I may also employ in carrying out my improved method of extrusion what may be termed "compound indirect" or "compound invert" extrusion wherein the metal of the blank is maintained stationary relative to a container that is closed at its rear end, as distinguished from its delivery end, and the die, as well as a portion of its pedestal, are caused to move through such container during the extrusion operation. However, I prefer to employ said compound direct extrusion, since thereby all possibility of seizure between the telescoping die and container and the liability of the consequent fracture of the die, due to its expansion under the intensive heat and enormous pressures developed, is completely eliminated. To accomplish such compound "indirect" or "invert" extrusion the telescoping extrusion tool 72 is dispensed with and the said container which is closed at its rear end is caused to move in response to the pressure exerted thereon by a crosshead, such as the crosshead 6 carried by the plunger means at one end of the press, in telescoping relation over the die and the pedestal thereof, which latter is in turn carried by the opposing crosshead, such as the cross-head 5, carried by the opposing and oppositely moving plunger means.

The expression "high melting point" as used in the claim is intended to refer to temperatures above 2,000° F. The ingots or blanks should not be heated to the melting point but only until a plastic condition results, for example, in the case of ordinary 0.30 carbon steel, a range of temperature from about 2350° F. to 2400° F. is especially suitable.

Since the extrusion tool, or the mandrel when the latter is employed, upsets a polygonal or corrugated billet until it assumes by expansion the shape of the cylindrical container, the expression "length-to-diameter" has been employed to refer to the condition of the upset blank when so upset or expanded to a cylindrical shape corresponding to that of the cylindrical extrusion chamber.

The fact that my improved method of extrusion renders it possible to extrude large metal ingots, especially those in excess of 20 inches in diameter and yet to effect a complete working of the metal whereby inherent defects are clearly eliminated, by virtue of the fact that a reduction of from 8 to 1 to a maximum of 15 to 1 can be satisfactorily effected. This ability to extrude ingots or partially worked blanks in such process renders it of the utmost importance to industry, since it greatly reduces the cost of producing elongated solid and hollow shapes of the selected metal by virtue of the fact that it is unnecessary to employ billets or thoroughly worked metal blanks, the employment of which would materially increase the cost of the extruded shapes because of the expense entailed in the production thereof from ingots. However, in order to insure that the metal of the ingot or partially worked blank will be thoroughly worked, the length-to-diameter ratio of the particular ingot or partially worked blank employed should not exceed about 4 to 1 and preferably should be within the range of about 3 to 1 to 3½ to 1.

Due to the compound extrusion action which is effected in my improved press, not only is the speed of extrusion double that of the speed of movement of each plunger, but the distance or movement or stroke of the main plungers and the amount of water introduced thereinto from its associated water bottle is but one-half of that which would otherwise be required and accordingly the drop in pressure of the air in the air reservoir during the extrusion is but one-half which would otherwise occur in the case of a single ended press. Consequently where, as hereinbefore stated, the air bottles are of a capacity of some 8 times that of the water bottles with which they are associated, substantially the maximum pressures of the original charge in the air bottles is available throughout.

The stripping of the nubbin can be accomplished with equal facility by merely effecting the movement of the die alone by traverse cylinders whose pistons are connected to the die by suitable connecting rods which extend through and reciprocate with respect to the pedestal. Such an arrangement also renders it possible to readily dislodge or knock out the die from its supporting pedestal when it is desired to replace the die.

The term "plunger" is used in the claim in a generic sense and includes the pistons or rams which reciprocate in the pressure cylinder, whereas the term "extrusion tool", as herein employed, refers to the element which projects into the container and actually contacts with the hot metal and, in co-operation with action or movement of the die employed, effects the extrusion of the metal therethrough.

This application is a continuation, in part, of my copending applications No. 741,558 filed Aug. 27, 1934, and No. 24,188 filed May 31, 1935.

Various changes and modifications of the within described method and apparatus may be made without departing from the spirit of my invention as embraced within the scope of the appended claim.

Having thus described my invention, what I claim and desire to obtain by United States Letters Patent is:—

In the method of extruding elongated metal shapes, the steps which comprise effecting the extrusion of the metal of a hot plastic metal blank confined within a container through a forming die into the desired elongated shape, having an integral nubbin of elongated cross-section as compared with that of the extruded shape proper, and, following the completion of the extrusion, causing the sudden direct impact of the die with the nubbin with sufficient force to sever the nubbin from the extruded shape.

STANLEY W. SPARKS.